United States Patent [19]

Hanada et al.

[11] Patent Number: 4,872,497
[45] Date of Patent: Oct. 10, 1989

[54] PNEUMATIC RADIAL TIRE AND RIM COMBINATION FOR PASSENGER CAR

[75] Inventors: Ryoji Hanada, Hiratsuka; Tuneo Morikawa, Hadano; Kazuyuki Kabe, Hiratsuka, all of Japan

[73] Assignee: The Yokohama Rubber Co., Ltd., Tokyo, Japan

[21] Appl. No.: 137,214

[22] Filed: Dec. 22, 1987

Related U.S. Application Data

[63] Continuation-in-part of Ser. No. 864,360, May 19, 1986, abandoned.

[30] Foreign Application Priority Data

Nov. 26, 1984 [JP] Japan ................. 59-248142

[51] Int. Cl.$^4$ ............................................ B60C 15/06
[52] U.S. Cl. ................. 152/541; 152/379.5; 152/546; 152/556
[58] Field of Search ............ 152/541, 548, 552, 555, 152/556, 546, 379.5; 57/902

[56] References Cited

U.S. PATENT DOCUMENTS

| | | | |
|---|---|---|---|
| 3,977,172 | 8/1976 | Kerawalla | 57/902 X |
| 4,023,608 | 5/1977 | Meiss | 152/541 |
| 4,139,040 | 2/1979 | Samoto et al. | 152/541 |
| 4,285,381 | 8/1981 | Furukawa et al. | 152/541 |
| 4,326,576 | 4/1982 | Mizumoto et al. | 152/541 |
| 4,462,447 | 7/1984 | Siefert et al. | 152/541 X |

FOREIGN PATENT DOCUMENTS 49-120303 11/1974 Japan.

OTHER PUBLICATIONS

Woods, E. C., Pneumatic Tire Design, W. Heffer & Sons Ltd., Cambridge, England, 1955 (pp. 27,28, 91-94).

*Primary Examiner*—Raymond Hoch
*Attorney, Agent, or Firm*—Armstrong, Nikaido, Marmelstein. Kubovcik & Murray

[57] ABSTRACT

An pneumatic radial tire for a passenger car having an improved durability, which tire has a carcass layer formed of aromatic plyamide cords in which an end portion of the carcass layer is turned up around an annular bead wire and a lower bead filler from the inside to the outside of the tire to form a turnup portion which is extended along the main body of the carcass layer, wherein an upper bead filler having a JIS hardness of from 75 to 95 is disposed axially outside the turnup portion, and wherein the height b (mm) of the lower bead filler relative to the height a (mm) of a rim flange upon which the tire is mounted satisfies the formula:

$$(a-5) < b < (a+10)$$

wherein a is the G dimension specified by JIS-D-4218-1981.

3 Claims, 2 Drawing Sheets

PNEUMATIC RADIAL TIRE AND RIM COMBINATION FOR PASSENGER CAR

This application is a continuation-in-part of application Ser. No. 864,360, filed May 19, 1986, now abandoned.

BACKGROUND OF THE INVENTION

This invention relates to a pneumatic radial tire for a passenger car having an improved durability at a turnup portion of its carcass layer made of aromatic polyamide fiber cords.

Pneumatic radial tires for a passenger car generally use cords of organic fibers such as nylon fibers, polyester fibers, rayon fibers or the like as the cords of a carcass layer and include two or more belt layers having a structure in which steel cords of one layer cross those of the other layer or layers. Due to the existence of the belt layers, the pneumatic radial tires have improved wear resistance, high speed durability and maneuvering stability when compared with conventional bias tires. In addition, rolling resistance of the radial tires is reduced. In order to improve productivity and to reduce the tire weight, one-ply arrangement tends to be employed instead of two-ply arrangement for disposing the carcass layer.

In pneumatic radial tires having a tire size greater than 195/70 SR 14, however, it is difficult to employ the one-ply arrangement for the carcass layer by use of the organic fiber cords described above from the viewpoint of tire strength.

Therefore, it has lately been proposed to utilize aromatic polyamide fiber cords as the cords of the carcass layer of pneumatic radial tires as disclosed in Japanese patent application Kokai (laid-open) publication No. 49-120,303.

Aromatic polyamide fiber cords have by far higher strength than conventional organic fiber cords. Therefore, when aromatic polyamide fiber cords are used, the carcass layer which has heretofore required the two-ply arrangement can be formed by the one-ply arrangement so that productivity can be improved. However, since the aromatic polyamide fibers have high crystallinity due to their molecular structure, adhesion with covering rubber is low, and hence separation (peel of the cords from the rubber) is likely to occur at a turnup portion of the carcass layer when the aromatic polyamide fiber cords are used.

SUMMARY OF THE INVENTION

It is an object of the present invention to provide a pneumatic radial tire for a passenger car which can improve durability of a carcass layer made of aromatic polyamide fiber cords, particularly durability of a turnup portion of the carcass layer.

In a pneumatic radial tire of the type wherein aromatic polyamide fiber cords are arranged in a carcass layer, the above object of the present invention can be accomplished by providing a pneumatic radial tire for a passenger car, mounted to a rim, which tire has a carcass layer formed of aromatic polyamide fiber cords in which an end portion of the carcass layer is turned up around an annular bead wire and a lower bead filler from the inside to the outside of the tire to form a turnup portion which is extended along the main body of the carcass layer, wherein an upper bead filler having a JIS hardness of from 75 to 95 is disposed axially outside the turnup portion, and wherein the height b (mm) of the lower bead filler relative to the height a (mm) of a rim flange upon which the tire is mounted satisfies the formula:

$$(a-5) < b < (a+10)$$

wherein a is measured radially outward from the diameter of the rim set to the upper end of the rim flange and is known as the G dimension according to JIS-D-4218-1981, within a range of about 14 to about 21.5 corresponding to nominal rim widths of 3.50B to 7 L.

The above and other objects and features of the present invention will become more apparent from the following description to be taken in conjunction with the accompanying drawings.

DETAILED DESCRIPTION OF THE PREFERRED EMBODIMENTS

Figure 1:
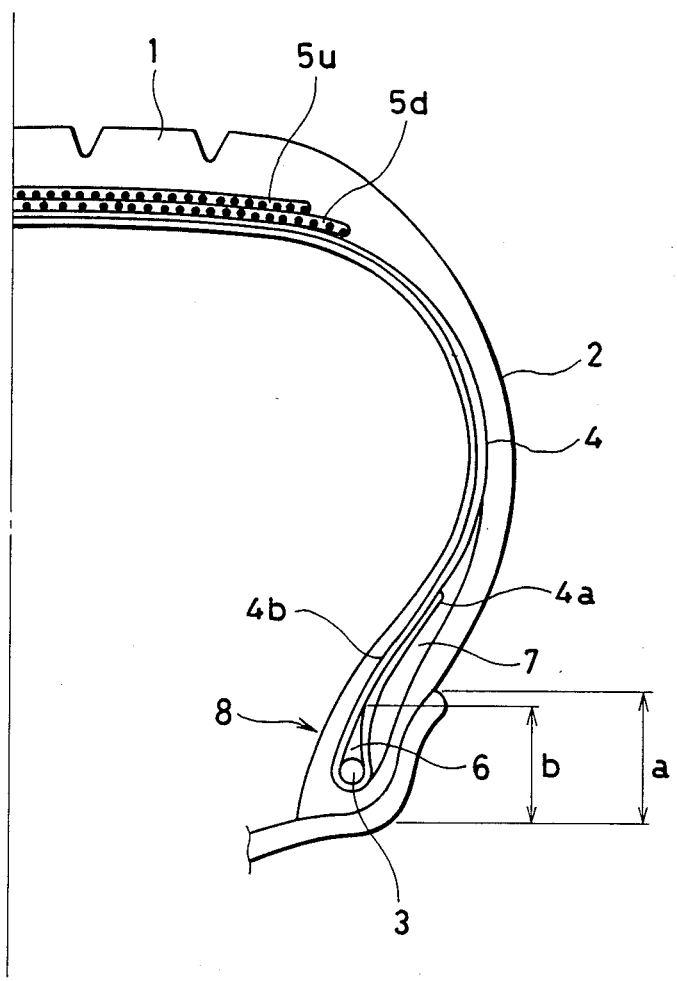
FIG. 1 is a sectional view of a half portion, in a meridial direction, of a pneumatic radial tire for a passenger car embodying the present invention.

In FIG. 1, the reference numeral 1 represents a tread, 2 is a pair of right and left side walls and 4 is a carcass layer which is fitted between a pair of annular bead wires 3 and 3. A belt layer consisting of an upper belt layer 5u and a lower belt layer 5d is disposed in the tread 1 in such a manner as to encompass the outer periphery of the carcass layer 4.

Steel cords are primarily used as the cords of the belt layer but other cords such as aromatic polyamide fiber cords may also be used.

A belt cover layer may be disposed annularly outside the belt layer in the circumferential direction of a tire so as to further improve the high speed running performance.

Aromatic polyamide fiber cords are arranged in the carcass layer 4. The aromatic polyamide fiber cords used herein are obtained by twisting aromatic polyamide fibers having a tensile strength of at least 150 kg/mm² and a tensile elastic modulus of at least 3,000 kg/mm² in such a manner that a twist coefficient K of the formula below is within the range of $1,000 \leq K \leq 3,500$, to thereby obtain cords and then subjecting the resulting cords to bonding heat-treatment:

$$K = TD$$

where
K: twist coefficient,
T: number of turns per 10 cm of cord,
D: total denier of cord.

In the present invention, each end portion of the carcass layer 4 is turned up around the annular bead wires 3 and around a lower bear filler 6 disposed on the bead wires 3 from the inside to the outside of the tire to thereby form a turnup portion 4a, which is then extended along the main body of the carcass layer 4b, and an upper bead filler 7 having a JIS hardness of from 75 to 95 is disposed outside the turnup portion 4a. The symbol a (mm) in FIG. 1 represents a rim flange height measured radially outward from the diameter of the rim seat to the upper end of the rim flange and b (mm)

denotes the height of the lower bead filler 6. The structure of the bead portion 8 is specified in the manner described above for the following reasons.

Figure 2A:
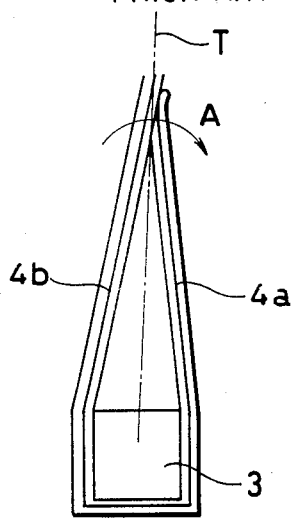
FIGS. 2(A), 2(B) and 2(C) are each an enlarged view of a principal bead portion of a tire.
Figure 2B:
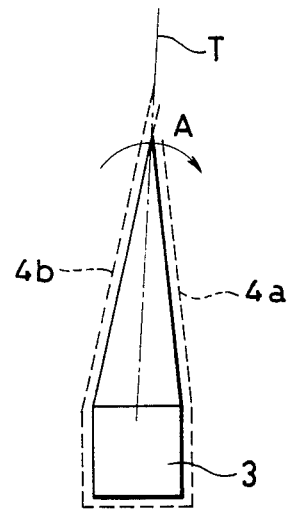
Figure 2C:
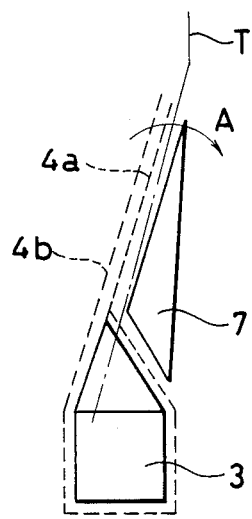

FIGS. 2(A), 2(B) and 2(C) are enlarged views of principal portions of the tire bead. FIG. 2(A) shows a tire having a conventional bead structure which uses organic fiber cords such as polyester fiber cords, nylon fiber cords, rayon fiber cords or the like for the cords of the carcass layer. FIG. 2(B) shows a tire having a conventional bead structure which uses aromatic polyamide fiber cords for the cords of the carcass layer 4, and FIG. 2(C) shows a tire having a bead structure in accordance with the present invention which uses aromatic polyamide fiber cords for the cords of the carcass layer 4.

When the tire touches the ground and undergoes deformation, the bead portion of the tire is bent from the inside to the outside of the tire as represented by an arrow A in FIGS. 2(A), 2(B) and 2(C). Therefore, tensile force acts upon the inside of the tire while compressive force acts upon the outside. If the conventional bead structures such as those shown in FIGS. 2(A) and 2(B) are employed, therefore, the neutral axis T of bending is positioned in between the main body 4b of the carcass layer and the turnup portion 4a as shown in the drawings and hence compressive force acts upon the turnup portion 4a. When the aromatic polyamide fiber cords having a low compressive fatigue resistance are used for the carcass layer [FIG. 2(B)], therefore, the cords of the turnup portion 4a undergo compressive fatigue breakdown due to the compressive force resulting from the deformation of the tire due to contact with the ground.

In contrast, when the bead structure of the present invention such as the one shown in FIG. 2(C) is employed, the neutral axis T of bending is positioned close to the upper bead filler 7 in the vicinity of the inner surface of the tire as shown in the drawings, so that the compressive force does not substantially act upon the cords of the turnup portion 4a. Therefore, the breakage of the cores of the turnup portion 4a of the carcass layer can be prevented.

If the compressive rigidity outside the turnup portion 4a is low, durability cannot effectively be improved by merely extending the turnup portion 4a along the carcass layer main body 4b and disposing the upper bead filler 7 outside the turnup portion 4a as shown in FIG. 2(C).

In order to improve the durability of tires, the following formula should necessarily be satisfied according to the present invention:

$$(a-5) < b < (a+10)$$

wherein a (mm) is a value of the G dimension according to JIS-D-4218-1981, within a range of about 14 to about 21.5 corresponding to nominal rim widths of 3.50 B to 7 L and b (mm) is the height of the lower bead filler.

It is difficult to build a tire of which the height b of the lower bead filler does not exceed (a−5), and if such a tire can be built, it is impossible to attain an improvement in or relating to the tire durability: To set the height b of the lower bead filler to be smaller than (a−5) inclusive means to bend the cords at a relatively large curvature. Then, according to the present invention, the tire carcass layer is formed of aramid fiber cords which have a considerably higher rigidity in comparison to conventionally used fiber cords. Therefore, it is difficult to operate a vulcanization step with the aramid fiber cords maintained in a condition of being bent at such large curvature. Also, it is likely in this case that an excessive flow of rubber takes place, tending to generate the so-called flow cracks. Thus, the tire building becomes difficult. In addition to this, since aramid fiber cords have a relatively limited resistivity to bending, their durability in molded tires tends to be relatively low.

Then, if the height b of the lower bead filler is equal to or larger than (a+10), it no longer is feasible to attain an improvement in or relating to the durability of tires having a carcass layer comprising aromatic polyamide fiber cords as sought for according to the present invention.

Also, according to the present invention, the upper bead filler 7 to be disposed outside the turnup portion 4a should preferably have a JIS hardness of from 75 to 95. If the JIS hardness of the upper bead filler is below 75, it is impossible to attain an improvement in or relating to the tire durability as described above, and if it exceeds 95, on the other hand, not only the molding operation becomes difficult but it also is difficult to obtain a desirable driving comfort. Therefore, the upper bead filler 7 should preferably have a JIS hardness within the above range.

The lower bead filler 6 should preferably have a JIS hardness equal to or greater than that of the upper bead filler 7 from the viewpoint of obtaining a desirable maneuvering stability.

Now, the effects or results of the present invention will be described in more detail with reference to examples.

Example 1 (the present invention), Prior Art Example 1 and Comparative Examples 1 and 2

Four sample tires commonly of a tire size of 195/70 HR 14 were built according to the specification shown in the below Table 1.

TABLE 1

| | Example 1 | Prior Art Example 1 | Comparative Example 1 | Comparative Example 2 |
|---|---|---|---|---|
| Belt Layer | ST | ST | ST | ST |
| Carcass Cord Fiber | Aramid | Poly ES | Aramid | Aramid |
| Structure of Bead Portion | C | A | B | C |
| a − 5 | 13 | 13 | 13 | 13 |
| a + 10 | 28 | 28 | 28 | 28 |
| b | 22 | 40 | 40 | 22 |
| Hardness of Bead Filler: | | | | |
| Upper Bead Filler | 90 | 90 | 90 | 65 |
| Lower Bead Filler | 90 | 90 | 90 | 90 |
| Durability | 115 | 100 | 90 | 95 |

Notes:
ST: 40 steel cords of 1×5 (0.25) per 50 mm are bias laminated at 20° relative to the tire circumferential direction.

Aramid: 37 aromatic polyamide fiber cords (1000D/2) having 3000 for the K value per 50 mm are arranged substantially at 90° relative to the tire circumferential direction.

Poly ES: 55 polyester fiber cords (1000D/2) per 50 mm are laminated in two layers substantially at 90° relative to the tire circumferential direction.

Using a tester having a drum diameter of 1,707 mm, each of the sample tires was subjected to an indoor durability test under the following test conditions.

Rim: 5 1/2JJ×14
Inflation Pressure: 1.9 kg/cm$^2$
Speed: 80 km/hr
Initial Load: 525 kg By increasing the load by 50 kg every 2 hours, the sample tires were run until they became broken.

Test results are shown in the above Table 1, wherein the durability found of the Prior Art Example 1 is supposed to be 100 and taken as reference index.

From the Table 1, it is seen that the tire of the Example 1 (present invention) in which aromatic polyamide fiber cords are used for the cords of the carcass layer and which has the bead structure shown in FIG. 2(C) exhibits a 15% improvement of the durability when compared with the tire of the Prior Art Example 1. Also, the tire of Example 1 has a higher durability than the tires of Comparative Examples 1 and 2.

As described above, in pneumatic radial tires for a passenger car of the type in which aromatic polyamide fiber cords are arranged for the carcass layer, the pneumatic radial tire for a passenger car in accordance with the present invention has a construction wherein a turnup portion is extended along a carcass layer main body, and an upper bead filler having a JIS hardness of from 75 to 95 is disposed outside the turnup portion. This construction can improve the tire durability, particularly the durability of the turnup portion of the carcass layer.

Example 2 and Comparative Examples 3 to 8

Seven sample tires commonly of a tire size of 195/70 HR 14 were built according to the specification shown in the below Table 2.

TABLE 2

|  | Example | Comparative Example | | | | | |
|---|---|---|---|---|---|---|---|
|  | 2 | 3 | 4 | 5 | 6 | 7 | 8 |
| Belt Layer | ST | ST | ST | ST | ST | ST | ST |
| Carcass Cord Fiber | Aramid | Aramid | Aramid | Aramid | Poly ES | Poly ES | Poly ES |
| Structure of Bead Portion | C | C | C | C | C | B | C |
| a − 5 | 13 | 9 | 13 | 13 | 13 | 13 | 13 |
| a + 10 | 28 | 24 | 28 | 28 | 28 | 28 | 28 |
| b | 25 | 25 | 31 | 40 | 25 | 31 | 40 |
| Hardness of Bead Filler: |  |  |  |  |  |  |  |
| Upper Bead Filler | 90 | 90 | 90 | 90 | 90 | 90 | 90 |
| Lower Bead Filler | 90 | 90 | 90 | 90 | 90 | 90 | 90 |
| Maneuvering Stability | 99 | 93 | 91 | 91 | 100 | 98 | 97 |
| Durability | 116 | 102 | 101 | 90 | 100 | 102 | 102 |

Of each of the sample tires, an indoor durability test was conducted under the same conditions as in the above described Example 1, Prior Art Example 1 and Comparative Examples 1 and 2, except that a rim of 5½B×14 was used for the tire of the Comparative Example 3 and a rim of 5½JJ×14 was used for the tire of the Example 2 and for the tires of Comparative Examples 4 to 8.

Durability values and maneuvering stability values found of the sample tires as a result of the above durability tests are shown in the above Table 2.

From the Table 2, it is seen that with such tires according to the present invention which have a carcass layer composed of aromatic polyamide fiber cords and an upper bead filler having a JIS hardness of 90 in the turnup portion of the carcass layer, when the tires satisfy the following relationship between the height a (mm) of the rim flange and the height b (mm) of the lower bead filler, it is feasible to obtain a remarkably improved durability without a sacrifice to the maneuvering stability:

$$(a-5)<b<(a+10).$$

We claim:

1. A pneumatic radial tire for a passenger car and rim combination, said tire being mounted on said rim, said rim having a ring flange, said tire having a carcass layer formed of aromatic polyamide fiber cords in which an end portion is turned up around an annular bead wire and a lower bead filler from the inside to the outside of the tire to form a turnup portion which is extended along the main body of said carcass layer, wherein an upper bead filler having a JIS hardness of from 75 to 95 is disposed axially outside said turnup portion, and wherein the height b (mm) of said lower bead filler relative to the height a (mm) of said rim flange upon which said tire is mounted satisfies the formula:

$$(a-5)<b<(a+10).$$

wherein a is measured radially outward from the diameter of the rim seat to the upper end of the rim flange and is designated as the G dimension specified by JIS-D-4218-1981.

2. A pneumatic radial tire and rim combination according to claim 1, wherein said aromatic polyamide fiber cords are obtained by twisting together aromatic polyamide fibers having a tensile strength of at least 150 kg/mm$^2$ and a tensile elastic modulus of at least 3,000 kg/mm$^2$ in a manner such that a twist coefficient value K expressed by the following formula is in the range of $1,000 \leq K \leq 3,500$:

$$K = TD$$

wherein:
K: twist coefficient,
T: number of turns per 10 cm of cord,
D: total denier of cord, and subjecting the resulting cords to a bonding heat-treatment.

3. A pneumatic radial tire and rim combination according to claim 1, wherein said lower bead filler disposed radially below said upper bead filler has a JIS hardness which is equal to or higher than that of said upper bead filler.

* * * * *